(12) United States Patent
Rampal

(10) Patent No.: US 10,657,625 B2
(45) Date of Patent: May 19, 2020

(54) IMAGE PROCESSING DEVICE, AN IMAGE PROCESSING METHOD, AND COMPUTER-READABLE RECORDING MEDIUM

(71) Applicant: NEC CORPORATION, Tokyo (JP)

(72) Inventor: Karan Rampal, Tokyo (JP)

(73) Assignee: NEC CORPORATION, Tokyo (JP)

( * ) Notice: Subject to any disclaimer, the term of this patent is extended or adjusted under 35 U.S.C. 154(b) by 40 days.

(21) Appl. No.: 16/074,484

(22) PCT Filed: Mar. 29, 2016

(86) PCT No.: PCT/JP2016/001823
§ 371 (c)(1),
(2) Date: Aug. 1, 2018

(87) PCT Pub. No.: WO2017/168462
PCT Pub. Date: Oct. 5, 2017

(65) Prior Publication Data
US 2019/0043168 A1 Feb. 7, 2019

(51) Int. Cl.
*G06T 3/40* (2006.01)
*G06K 9/62* (2006.01)
(Continued)

(52) U.S. Cl.
CPC .......... *G06T 3/4046* (2013.01); *G06K 9/3241* (2013.01); *G06K 9/6212* (2013.01);
(Continued)

(58) Field of Classification Search
CPC ....... G06T 3/4046; G06T 7/33; G06K 9/6265; G06K 9/6212; G06K 9/3241; G06K 9/527; G06N 20/00
See application file for complete search history.

(56) References Cited

U.S. PATENT DOCUMENTS

2004/0197013 A1 10/2004 Kamei
2009/0028384 A1 1/2009 Bovyrin et al.
(Continued)

FOREIGN PATENT DOCUMENTS

JP 2003187229 A 7/2003
WO 2008114683 A1 9/2008

OTHER PUBLICATIONS

Li et al., "A Scale Adaptive Kernel Correlation Filter Tracker with Feature Integration", Conference Paper, Mar. 2015, pp. 1-12 (total 13 pages).
(Continued)

*Primary Examiner* — Christopher Wait
(74) *Attorney, Agent, or Firm* — Sughrue Mion, PLLC

(57) ABSTRACT

An image processing device according to one of the exemplary aspects of the present invention includes: a scale space generation means for generating the scaled samples from a given input region of interest; feature extraction means for extracting features from the scale samples; a likelihood estimation means for deriving an estimated probability distribution of the scaled samples by maximizing the likelihood of a given scaled sample and the parameters of the distribution; a probability distribution learning means for updating the model parameters given the correct distribution of the scaled samples; a template generation means to combine the previous estimates of the object features into a single template which represents the object appearance; an outlier rejection means to remove samples which have a probability below the threshold; and a feature matching means for obtaining the similarity between a given template and a scaled sample and selecting the sample with the maximum similarity as the final output.

15 Claims, 8 Drawing Sheets

(51) Int. Cl.
*G06T 7/33* (2017.01)
*G06N 20/00* (2019.01)
*G06K 9/32* (2006.01)

(52) U.S. Cl.
CPC .......... *G06K 9/6265* (2013.01); *G06N 20/00* (2019.01); *G06T 7/33* (2017.01)

(56) References Cited

U.S. PATENT DOCUMENTS

2010/0165113 A1  6/2010  Abe
2012/0328161 A1  12/2012  Palenychka et al.

OTHER PUBLICATIONS

Rampal et al., "Fast and accurate scale estimation method for object tracking", 2016 23rd International Conference on Pattern Recognition (ICPR), Dec. 4-8, 2016, pp. 2712-2715 (total 4 pages).
Communication dated Nov. 11, 2019 from European Patent Office in counterpart EP Application No. 16896684.4.
Communication dated Sep. 3, 2019, from the Japanese Patent Office in application No. 2018-551491.
Martin Danelljan, et al., "Accurate Scale Estimation for Robust Visual Tracking", Proceedings of the British Machine Vision Conference (BMVC), 2014, pp. 1-11.
Jin Zhang, et al., "Scale adaptive visual tracking with latent SVM", Electronic Letters, Dec. 4, 2014, pp. 1933-1934, vol. 50, No. 25.

[Fig. 1]
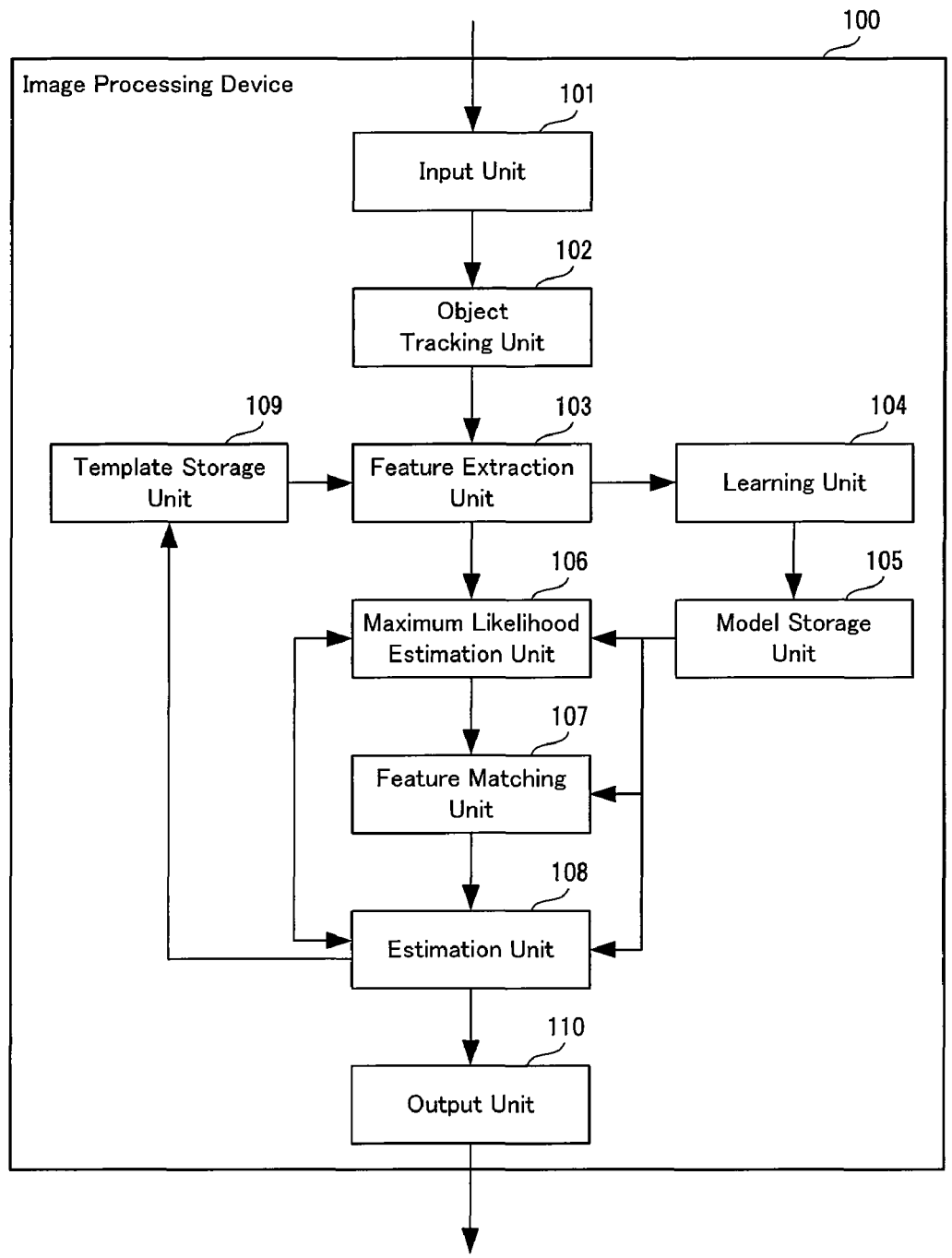

[Fig. 2]
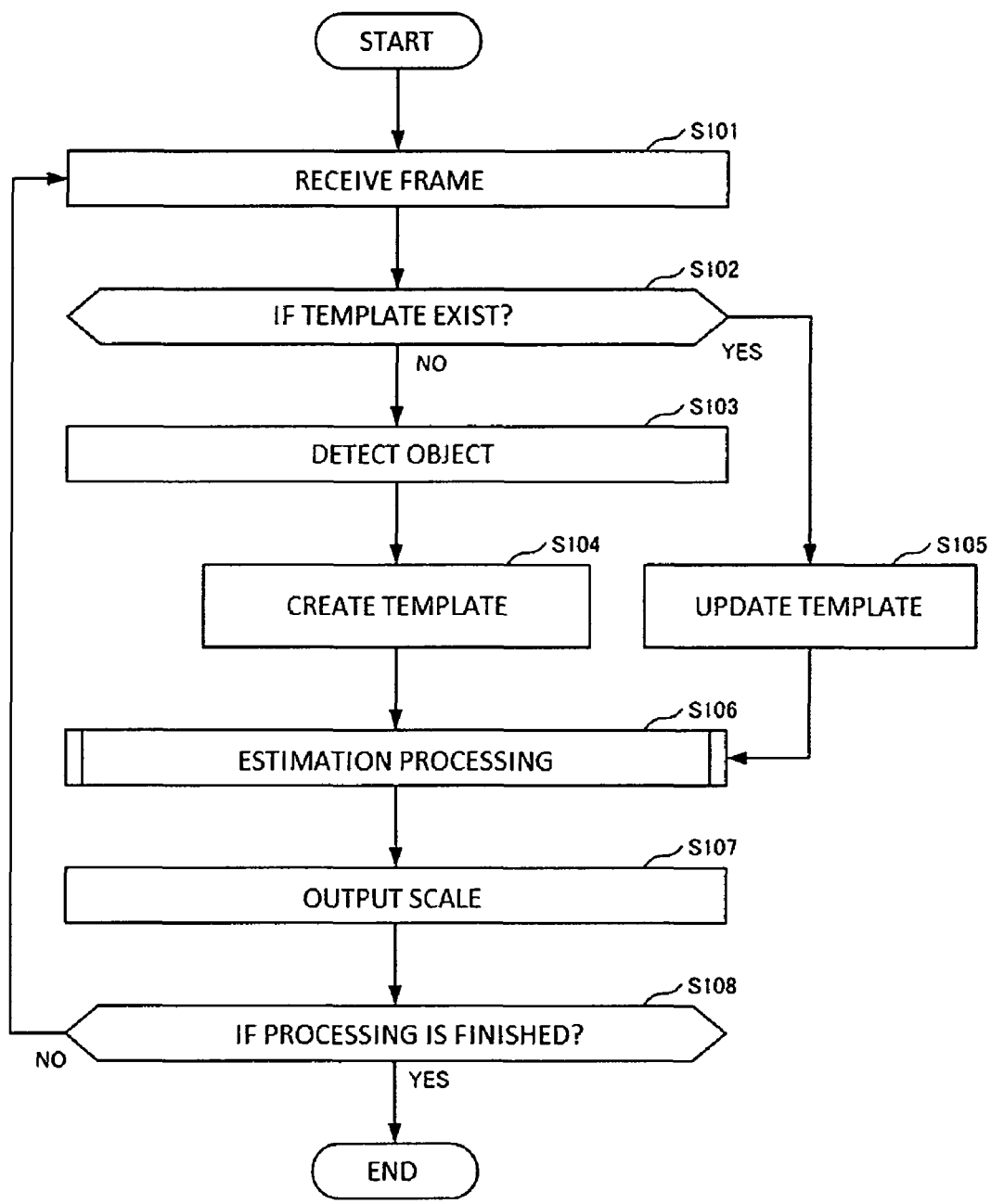

[Fig. 3]
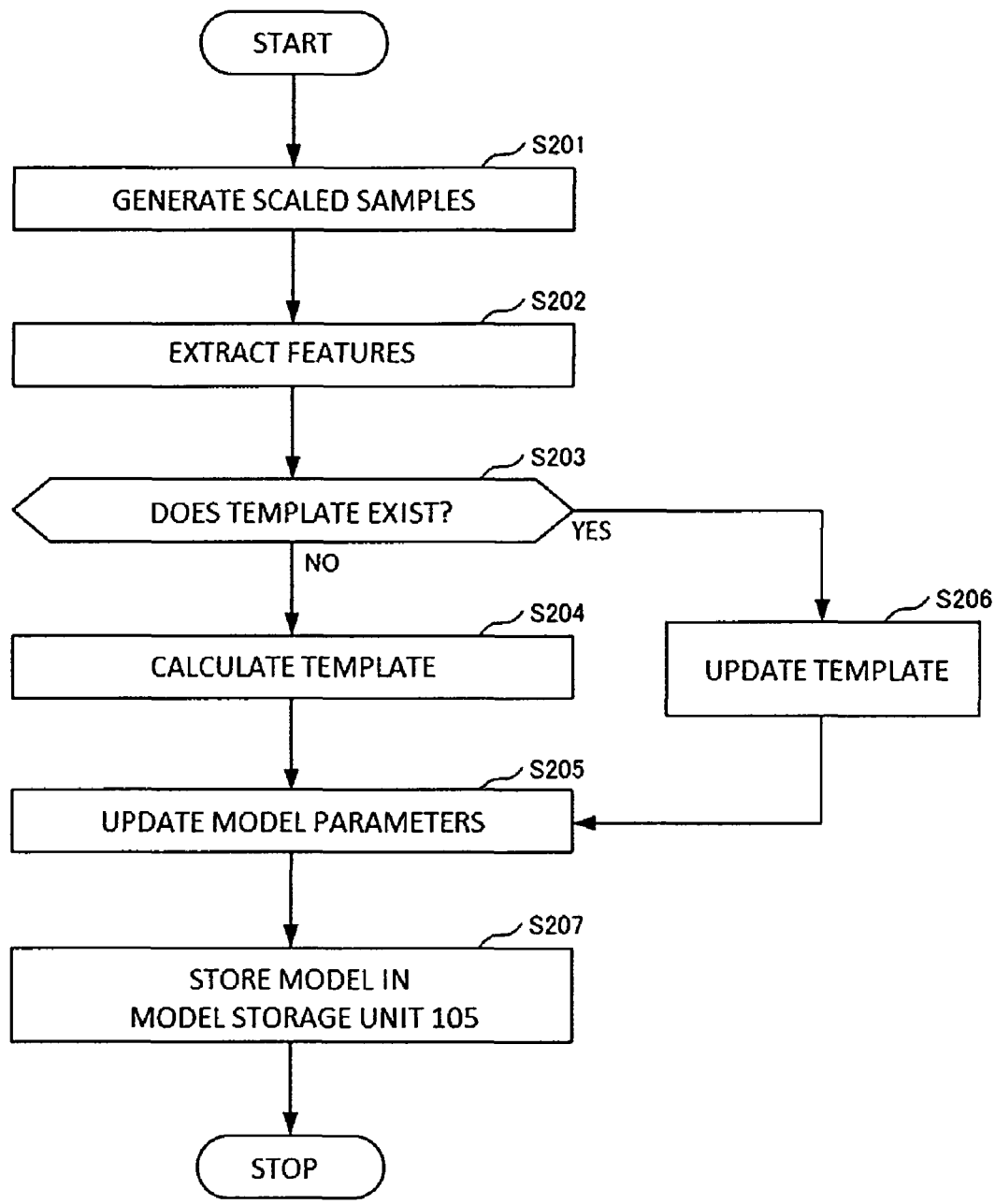

[Fig. 4]
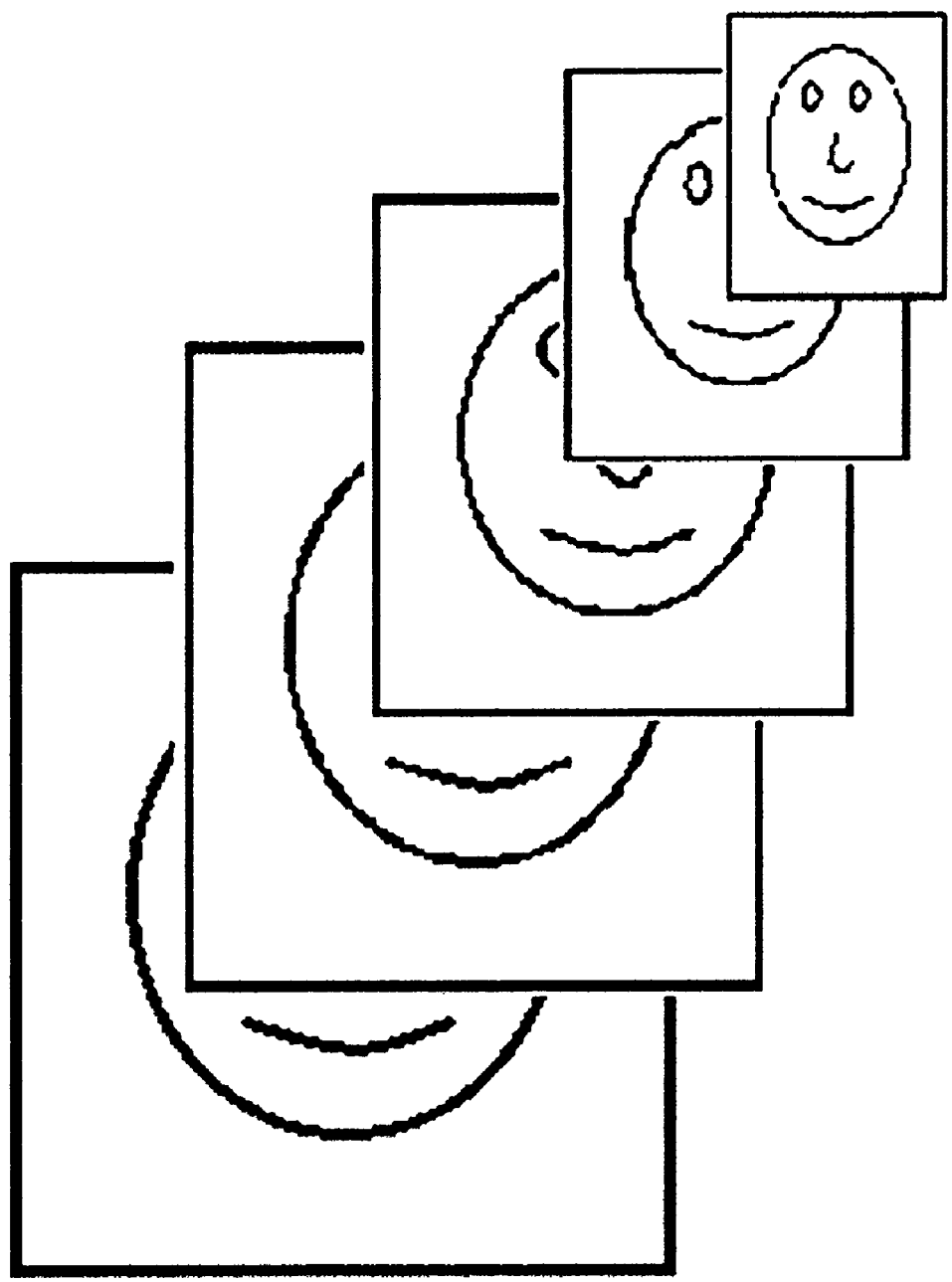

[Fig. 5]
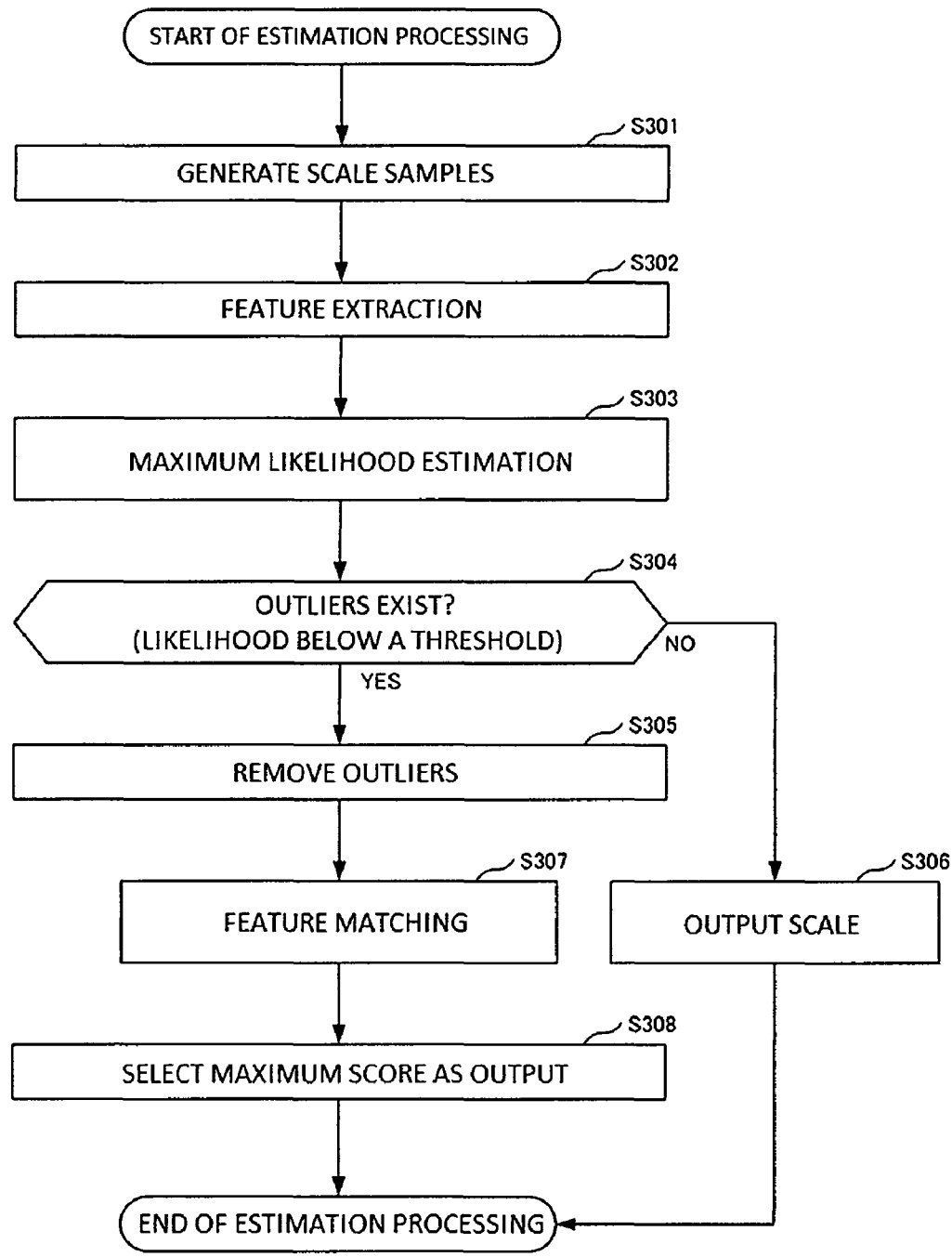

[Fig. 6]
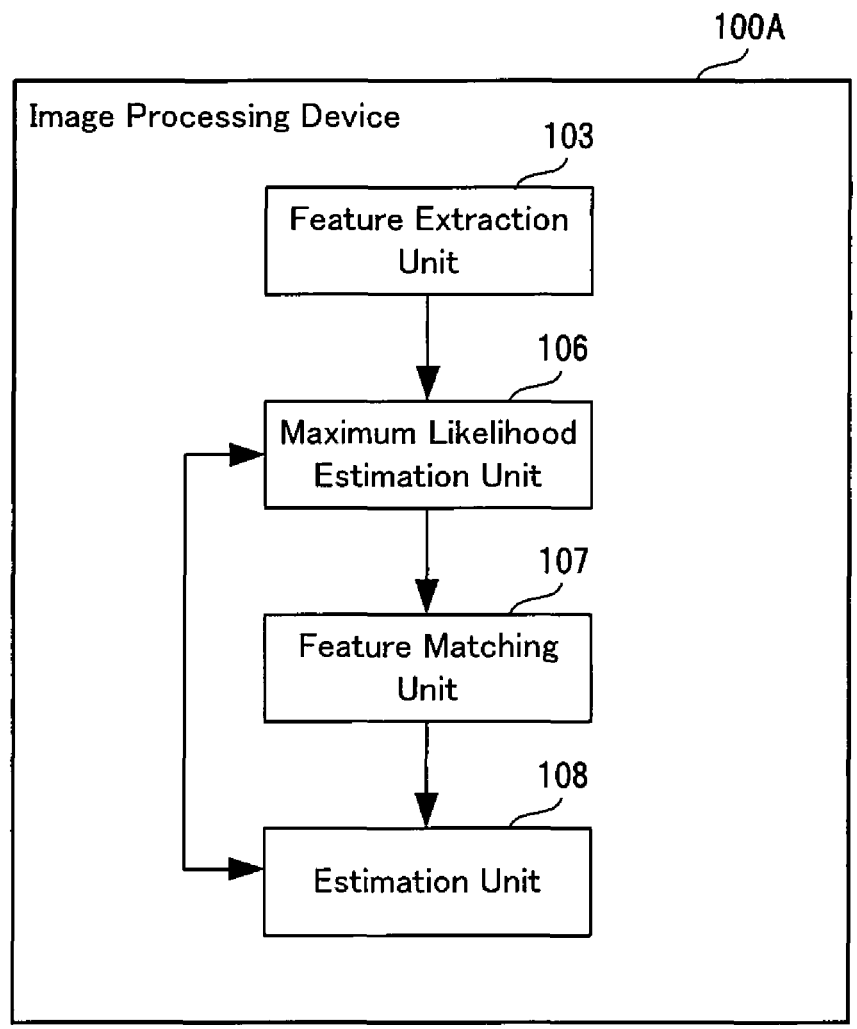

[Fig. 7]
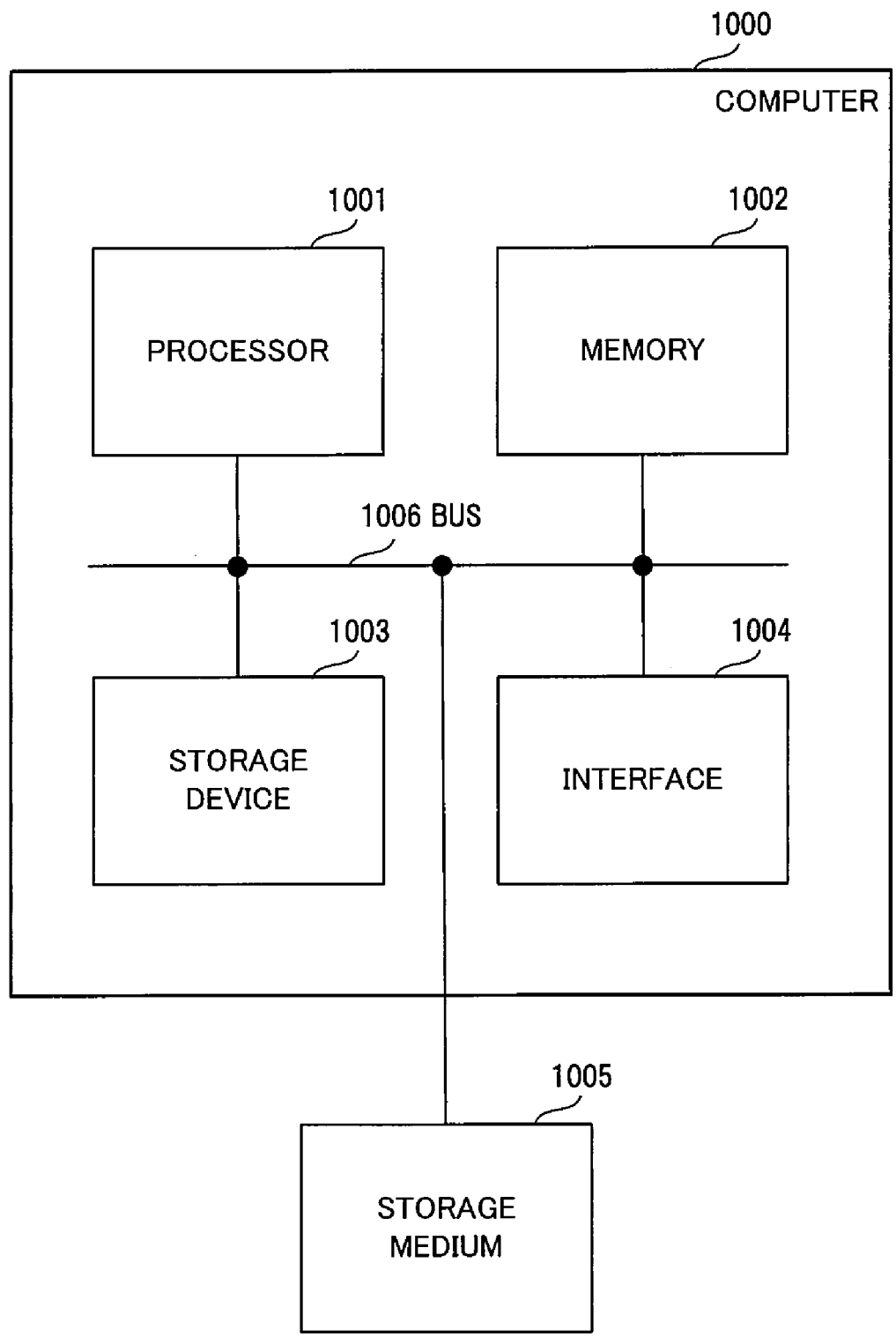

[Fig. 8]
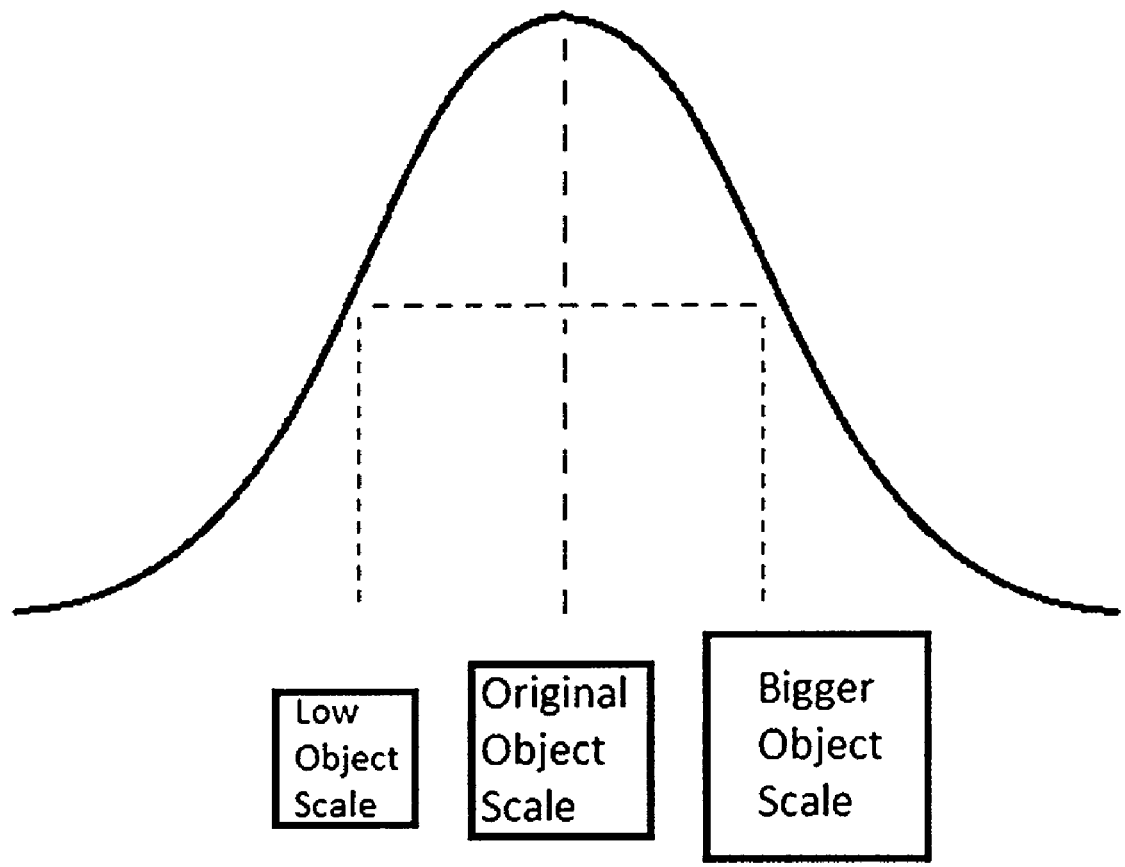

IMAGE PROCESSING DEVICE, AN IMAGE PROCESSING METHOD, AND COMPUTER-READABLE RECORDING MEDIUM

CROSS REFERENCE TO RELATED APPLICATIONS

This application is a National Stage of International Application No. PCT/JP2016/001823 filed Mar. 29, 2016.

TECHNICAL FIELD

The present invention relates to image processing technology, and more particularly to image processing technology of estimating the scale of the object during tracking.

BACKGROUND ART

Object tracking in video data is an important task and has a lot of applications such as in surveillance. The output of tracking is the state of the object in every frame. The state of the object is usually defined by its position i.e. x, y co-ordinates and the scale i.e. width and height. One of the conventional methods is multi resolution tracking in which a scale-space is created and then searched for the best location and scale. Scale space refers to generating multiple samples from a region of interest by rescaling and Low-pass filtering. These samples are then used by the tracking algorithm for searching. The scale and location where the score is the highest is the output.

For robust tracking we need to estimate both location and scale, so as to prevent drift. But, most applications require tracking to be done in real time i.e. the time taken to process one input video frame should be small. This puts the limit on the number of samples that can be searched.

To tackle this problem, many methods only estimate location and assume that the change in scale is not significant. This allows them to search at multiple locations but at only one scale i.e. fixed width and height. Hence real time performance can be achieved by searching at different locations at only one scale.

One of the methods for scale estimation is using correlation filters, see NPL 1. In NPL 1, scale estimation is formulated as a regression problem, where the filters are learnt using the target appearance and updated every frame. To solve the regression problem Fast Fourier Transform is used.

Another method for scale estimation is using latent Support Vector Machine (SVM), see NPL 2. In NPL 2, the object scale is assumed to be the latent or hidden variable and the problem is formulated as a latent SVM. The optimization is solved using an iterative co-ordinate ascent method.

In PTL 1, the object scale is estimated by calculating the 3D transformation parameters i.e. the perspective projection matrix. In this method a projection matrix is learnt to convert the 3D points in the real world to 2D points in the camera image.

PTL 2 discloses the scale estimation by calculating the contrast to variance ratio at each scale sample and selecting the maximum as the best approximation.

CITATION LIST

Patent Literature

PTL 1: United States patent application publication no. US 2009/0028384 A1.

PTL 2: United States patent application publication no. US 2012/0328161 A1.

Non Patent Literature

NPL 1: Martin Danelljan, Gustav Hager, Fahad Shahbaz Khan and Michael Felsberg, "Accurate Scale Estimation for Robust Visual Tracking". Proceedings of the British Machine Vision Conference (BMVC), 2014

NPL 2: Jin Zhang; Kai Liu; Fei Cheng; Wenwen Ding, "Scale adaptive visual tracking with latent SVM," in Electronics Letters, vol. 50, no. 25, pp. 1933-1934, Dec. 4, 2014

SUMMARY

Technical Problem

Tracking involves searching for the object in a given region of interest (ROI) across several scales. Hence the tracking algorithm must run at least; the number of scale samples (S) times the search locations (L). In situations where the object motion is rapid the region of interest increases therefore increasing 'I' and in cases where scale change is large then 'S' will also be large. This means that if either 'S' or 'L' increase then the run time of the algorithm will also increase. This is a problem for real time applications where there is a limit on the algorithm run time.

In NPL 1, correlation filters are used for both location and scale estimation. The filters are designed by linear regression, where the output variable of regression is chosen to be a Gaussian. The linear regression is solved using Fast Fourier Transforms; for speed. The assumption in this method is that an increase or decrease in scale corresponds to the same Gaussian i.e. the peak of Gaussian corresponds to the correct scale whereas the scales which are less/more correspond to either side of the peak, which is symmetric. This assumption is may not be true as decrease in scale and increase in scale can correspond to different Gaussians with different means and variance. FIG. 8 is a representation of the NPL 1, where the Gaussian represents the value of the output regression variable corresponding to the input scale values. As can be seen the assumption is that the output is symmetric but the scales are not, hence this assumption is not always valid.

The method disclosed in NPL 2 models the scale as a latent variable and solves the resultant optimization problem using support vector machine. For a video input, this method needs to update the model every frame as the scale may change in every frame. Therefore support vectors are generated in every frame and theoretically can become very large for large videos, making it difficult to use in real time scenario.

In PTL 1, since the 3D data is converted to 2D data, there is a need to calibrate the camera and obtain the correct X, Y, and Z information of a point in the real world. This is not always feasible as we may not have access or control of the environment. Without calibration we cannot learn the projection matrix needed to perform the transformation.

The method disclosed in PTL 2 calculates the contrast to variance ratio of the ROI at various scales. For cases where there is illumination change or the image is blurred due to fast motion it will be difficult to find the ratio corresponding to the correct scale.

The current invention has been conceived to solve the above mentioned problems. In addition to the entities described above, other apparent and obvious drawbacks that this invention can overcome will be revealed from the detailed specification and drawings.

One of the objects of the present invention is to provide an image processing device that is capable of estimating the scale of an object accurately and in real time.

Solution to Problem

An image processing device according to one of the exemplary embodiment of the present invention includes: a scale space generation means for generating the scaled samples from a given input region of interest; feature extraction means for extracting features from the scale samples; a likelihood estimation means for deriving an estimated probability distribution of the scaled samples by maximizing the likelihood of a given scaled sample and the parameters of the distribution; a probability distribution learning means for updating the model parameters given the correct distribution of the scaled samples; a template generation means to combine the previous estimates of the object features into a single template which represents the object appearance; an outlier rejection means to remove samples which have a probability below the threshold; and a feature matching means for obtaining the similarity between a given template and a scaled sample and selecting the sample with the maximum similarity as the final output.

An image processing method according to one of the exemplary aspects of the present invention includes: a scale space generation means for generating the scaled samples from a given input region of interest; feature extraction means for extracting features from the scale samples; a likelihood estimation means for deriving an estimated probability distribution of the scaled samples by maximizing the likelihood of a given scaled sample and the parameters of the distribution; a probability distribution learning means for updating the model parameters given the correct distribution of the scaled samples; a template generation means to combine the previous estimates of the object features into a single template which represents the object appearance; an outlier rejection means to remove samples which have a probability below the threshold; and a feature matching means for obtaining the similarity between a given template and a scaled sample and selecting the sample with the maximum similarity as the final output.

A computer-readable medium according to one of the exemplary embodiment of the present invention stores a program which causes a computer to function as: a scale space generation means for generating the scaled samples from a given input region of interest; feature extraction means for extracting features from the scale samples; a likelihood estimation means for deriving an estimated probability distribution of the scaled samples by maximizing the likelihood of a given scaled sample and the parameters of the distribution; a probability distribution learning means for updating the model parameters given the correct distribution of the scaled samples; a template generation means to combine the previous estimates of the object features into a single template which represents the object appearance; an outlier rejection means to remove samples which have a probability below the threshold; and a feature matching means for obtaining the similarity between a given template and a scaled sample and selecting the sample with the maximum similarity as the final output. The program stored in the above described computer readable storage medium also realizes one of the exemplary aspects of the present invention.

Advantageous Effects of Invention

According to the present invention, it is able to estimate the scale of a tracked object accurately and in real time.

BRIEF DESCRIPTION OF DRAWINGS

FIG. 1 is a block diagram showing an example of a structure of an image processing device 100 according to a first exemplary embodiment of the present invention.

FIG. 2 is a flowchart illustrating an example of an operation of the image processing device 100 according to the first exemplary embodiment of the present invention.

FIG. 3 is a flowchart showing an example of an operation of the image processing device 100 according to the first exemplary embodiment of the present invention in training phase.

FIG. 4 is a figure showing an example of the scale space of the region of interest, where the object is a face.

FIG. 5 is a flow chart showing the estimation process of the image processing device 100 according the first exemplary embodiment of the present invention.

FIG. 6 is a block diagram showing an example of the image processing device 100A according to a second exemplary embodiment of the present invention.

FIG. 7 is a block diagram showing an example of a hardware structure of a computer 1000 which is able to realize the image processing device according to the exemplary embodiments of the present invention.

FIG. 8 is a representation of the NPL 1, where the Gaussian represents the value of the output regression variable corresponding to the input scale values.

DESCRIPTION OF EMBODIMENTS

To solve the technical problems discussed above, the overall approach is summarized here. The scale estimation process is decoupled from the location estimation process so as to speed up the process of tracking. Given the location of the object in the current frame, a number of scaled samples are generated. The likelihood of these samples is evaluated using the probability distribution model which is learnt by parameter estimation using previous frames and a template. The template is generated using the features extracted from the object in previous frames and combined to represent the appearance of the object. Using the likelihood model we can remove the outliers which have a probability below the threshold. Next, using feature matching we can obtain the score of the samples and select the one with the highest score as the output.

According to the present invention, it is able to estimate the scale of a tracked object accurately and in real time.

Another advantageous effect of the present invention is that there is no assumption on the relationship between the output score and scaled samples, unlike NPL 1 which assumes that the scores calculated by the filter are symmetric with respect to the scaled samples.

An additional advantageous effect of the present invention is that the model parameter updating involves fixed sized vectors and matrices unlike in NPL 2 where the number of support vectors can increase after every frame.

An additional advantageous effect of the present invention is that there is no need to calculate the projection matrix and hence no need for knowing the calibration information.

Another advantageous effect of the present invention is that illumination change does not affect the scale estimation since all the calculation involves features which are invariant to illumination changes.

First Exemplary Embodiment

Hereinafter, a first exemplary embodiment of the present invention will be described in detail.

FIG. 1 is a block diagram showing an example of structure of an image processing device 100 according to the first exemplary embodiment of the present invention. With reference to FIG. 1, the image processing device 100 includes an input unit 101, an object tracking unit 102, a feature extraction unit 103, a learning unit 104, a model storage unit 105, and a maximum likelihood estimation unit 106, a feature matching unit 107, an estimation unit 108, a template storage unit 109 and an output unit 110.

The input unit 101 receives a series of frames i.e. images, for example, frames of a video, still images or the like, in tracking phase. The input unit 101 may receive a series of frames i.e. training frames, for example, in learning phase or before the learning phase. In the following description, the frames and a frame in the frames may be referred to as "images" and an "image" respectively. The training frames and a training frame in the training frames are referred to as "training images" and a "training image" respectively.

The object tracking unit 102 tracks a region of an object, such as a face or one of other objects which may include several parts, in the frames. In the following explanation, the object tracking unit 102 tracks a region of a face in the frame. It provides the location of the face in the frame, i.e. the x and y co-ordinates.

The feature extraction unit 103 is used to extract the features from the region of interest that are provided to it. Using the location provided by the object tracking unit; scaled samples are generated. These samples are then normalized to lie in the same coordinate system. The coordinates are defined in a coordinate system set in advance in the frames. Finally, the features are extracted from these samples. These features can be a combination of edge, texture, color and/or temporal information from the samples.

The learning unit 104 learns the model by one or more series of training frames. More specifically, the learning unit 104 learns the model which will be used for calculating the likelihood of future samples, by features extracted from training frames. The learning unit 104 may calculate the mean vector and the covariance matrix from the features of the samples as part of the parameter learning for the model.

The model essentially captures the distribution of the features of the scaled samples. More specifically it captures the likelihood of a sample given the intra class variation. The intra class variations are the differences between the features of the same object, whereas the interclass variations which are caused by features of other objects are assumed to be outliers since the tracking unit 102 already has given the location. The model storage unit 105 stores the model's parameters which are used to evaluate the model on any input sample.

The maximum likelihood estimation unit 106 derives the probability of a scale sample using the model parameters stored in the model storage unit 105. The probability is used to eliminate the outliers by thresholding. This procedure eliminates the scale samples that are not consistent with the appearance of the object as represented by the features.

The samples which are passed by the maximum likelihood estimation unit 106 are the input of the feature matching unit 107. In this unit each of the features of the samples are directly matched and their similarity is calculated. The feature matching unit may use for example, a histogram intersection kernel or a Gaussian kernel to calculate the similarity score of the samples.

The estimation unit 108 selects the sample with the highest score as the estimated scale output. The features of the object at this scale are then combined with the previous frames estimate linearly and this forms the template. The template is stored in the template storage unit 109.

The output unit 110 outputs the final output state of the object i.e. the position and the scale. The output unit 110 may plot predetermined marks on the frame at positions represented by the x, y coordinates and the scale (width, height) of the object in the output the frame with the plotted marks.

Next, an operation of the image processing device 100 according to the first exemplary embodiment will be explained in detail with reference to drawings.

FIG. 2 is a flowchart illustrating an example of the operation of the image processing device 100 according to the first exemplary embodiment of the present invention.

The operation of the image processing device 100 according to the first exemplary embodiment of the present invention can be broadly divided into training and evaluation phase. In this paragraph an overview of the invention will be described with reference to FIG. 2 and the evaluation phase will be explained. The tracking of the object begins by detection of object in the initial frame and tracking of the object in the subsequent frames. As can be seen in FIG. 2, a frame is input to the system (Step S101) and the object tracking unit 102 performs a check to find out if the previous frames template (or template features) exists (Step S102). The previous template that is estimated based on a previous frame of the received frame. If no previous template exists (NO in Step S102), the object tracking unit 102 locates the position of the object (Step S103) which is detection of just a sub-region of the received frame containing the object. The object tracking unit 102 may be a specific implementation of a general object tracker. The detected object region is now represented by its features as a template (Step S104). When a template exists (YES in Step S102), the features are updated using the present frame (Step S105). The template is used in estimation processing (Step S106).

The estimation processing will be explained in detail later along with the drawings in FIG. 5. The following is a brief description of the estimation processing unit. This unit scores each of the samples generated from the current frame and the output scale is the one which has the maximum score.

Next, the output unit 110 outputs the estimated scale i.e. the final output described above (Step S107). When processing of the image processing device 100 is not finished (No in Step S108), the input unit 101 receives a next frame (Step S101). When processing of the image processing device 100 is finished by an instruction from a user of the image processing device 100 via a input device (not illustrated) (YES in Step S108), the image processing device 100 stops the processing shown in FIG. 2.

Next, an operation of the image processing device 100 according to the first exemplary embodiment in the training phase will be described in detail with reference to drawings.

FIG. 3 is a flow chart showing an example of an operation of the image processing device 100 according to the first exemplary embodiment in the training phase.

As described above, the models are needed to be learnt. So, before the scale estimation can be applied, a training phase is necessary, in which the models in the first exemplary embodiment will be learnt. Given the frame and the object location, scaled samples are generated by the step S201. These samples are extracted around the region given by the object location and the scale of the previous frame. Next, the features are extracted from theses samples (Step S202). Extracted features refer to features such as HOG (Histogram of Oriented Gradients), LBP (Local Binary Patterns), normalized gradients etc. In Step S203 we check if the template already exists i.e. if we are in the first frame or not. If the template does not exist (NO in Step S203) it means we are in the first frame and we need to create the template (Step S204). The template is the features extracted from the current location and scale given by the tracker. Using the template and the features of the samples we can update the model parameters (Step S205). This is done in the following way:

$$\bar{x} = \frac{1}{N} \sum_{i=1}^{N} x_i \qquad \text{[Math. 1]}$$

In the equation shown in Math 1, 'x bar' is the mean or average of the samples. It is one of the parameters of the multivariate Gaussian distribution that is used in modeling. The '$x_i$' is the vector of features of the $i^{th}$ sample and 'N' is the total number of scaled samples.

$$\sum = \frac{1}{N} \sum_{i=1}^{N} (x_i - \bar{x})(x_i - \bar{x})^T \qquad \text{[Math. 2]}$$

In the equation shown in Math 2, 'sigma' is the covariance matrix and 'T' means the vector transpose. Using these two equations we can update the model parameters. Also in case there is already a template i.e. YES for the Step S205, we need to update the template (Step S206) by linear interpolation using the following equation:

$$I_i = \alpha \times I_i + (1-\alpha) \times I_{i-1} \qquad \text{[Math. 3]}$$

Where in equation Math 3, '$I_i$' is the template from the current frame and '$I_{i-1}$' is the template from the previous frame. Here, 'alpha' is a decay factor which is chosen experimentally.

Next, we store the model parameters in the model storage unit (Step S207) in the model storage unit 105.

FIG. 4 is a figure showing an example of the scale space of the region of interest, where the object is a face. It is generated in Step S201 of the learning phase and also in the Step S301 in the evaluation phase.

Next, the evaluation phase which consists of the estimation processing step is explained. The estimation processing of the image processing device 100 will be described with reference to drawings in FIG. 5.

FIG. 5 is a flow chart showing the estimation process of the image processing device 100 according the first exemplary embodiment of the present invention. With reference to FIG. 5, the scaled samples are generated as shown in Step S301. The feature extraction unit, 103, is used to obtain the features of the samples as shown in Step S302. Given the features of the template and the scaled samples, maximum likelihood estimation is performed (Step S303). This is done as follows:

$$\beta = x_i - I_i \qquad \text{[Math. 4]}$$

The equation in Math 4, represents a sample difference 'beta' between the template and the $i^{th}$ scaled sample. This is also known as the intrapersonal difference. According to this equation, a class of variation can be defined i.e. the intrapersonal variation 'omega' as shown in the following equation:

$$P(\beta|\Omega) = N(\mu, \Sigma) \qquad \text{[Math. 5]}$$

In the equation shown in Math 5, the probability 'P(beta-lomega)' of the intrapersonal difference, given the intrapersonal variation, is defined as a multivariate normal distribution 'N(mu,sigma)'. The parameters of this distribution are given by 'mu' and 'siguma'. The likelihoods of observing 'beta' is:

$$P(\beta | \Omega) = \frac{1}{(2\pi)^{d/2} \Sigma^{1/2}} e^{\frac{-(\beta-\mu)^T \Sigma^{-1} (\beta-\mu)}{2}} \qquad \text{[Math. 6]}$$

In the equation shown in Math 6, 'd' is the dimension of the feature vectors. Using this equation we can get the likelihood of a sample. In the next step we check if any likelihood are below the threshold i.e. Step S304. If there are outliers, YES in Step S304, we can reject them and remove the samples from further processing in Step S305. In S305 thresholding is done to remove the samples, the threshold is selected empirically. If there are no outliers, NO in Step S304, then we choose the sample with the maximum likelihood as the output scale, i.e. Step S306 and end the estimation processing.

Next, in Step S307 feature matching is done between the features of the template and the samples. The matching can be done using the kernel methods such as intersection kernel, Gaussian kernel, polynomial kernel etc.

$$s = \frac{1}{d} \sum_{j=1}^{d} \min(x_j, I_j) \qquad \text{[Math. 7]}$$

The equation in Math 7, gives the matching score 's' between the template 'I' and the feature 'x'. Here, 'd' is the dimension length of the features and T is the dimension index. In the next Step S308 we select the output as the one with the maximum score.

The first advantageous effect of the present exemplary embodiment is that it is able to estimate the scale of the object accurately and in real time.

Other advantageous effects of the present exemplary embodiment will be explained in the following. The advantage of the present exemplary embodiment is that, there is no need to calculate the projection matrix or the need to use the 3D co-ordinates of a known object as in PTL 1. Also there is no need effect of illumination change since there is no need to calculate the contrast to variance ratio as in PTL 2. Secondly, heavy optimization techniques such as latent support vector machines are not needed and hence real time operation is easily possible. Moreover, rigid and non-rigid shapes can be easily tracked. Furthermore, exemplars for changes in shape, pose and parts is not needed.

Second Exemplary Embodiment

Next, a second exemplary embodiment of the present invention will be described in detail with reference to drawings.

FIG. 6 is a block diagram showing an example of the image processing device 100A according to the second exemplary embodiment of the present invention. With reference to FIG. 6, the image processing device 100A includes: a feature extraction unit 103 which extracts features from an image based on a region of interest; a maximum likelihood estimation unit 106 which derives the probability of a intrapersonal difference given the intrapersonal variations; a feature matching unit 107 which detects the similarity between the features of scaled samples and a template image; and an estimation unit 108 which selects the sample with the maximum likelihood or similarity score as the final output.

The second exemplary embodiment has the same advantageous effect as the first advantageous effect of the first exemplary embodiment. The reason causes the advantageous effect is the same as that of the first advantageous effect of the first exemplary embodiment.

Other Exemplary Embodiment

Each of the image processing device 100 and the image processing device 100A can be implemented using a computer and a program controlling the computer, dedicated hardware, or a set of a computer and a program controlling the computer and a dedicated hardware.

FIG. 7 is a block diagram showing an example of a hardware structure of a computer 1000 which is able to realize the image processing device 100 and the image processing device 100A, which are described above. With reference to FIG. 7, the computer 1000 includes a processor 1001, a memory 1002, a storage device 1003 and an interface 1004, which are communicably connected via a bus 1006. The computer 1000 can access storage medium 1005. Each of the memory 1002 and the storage device 1003 may be a storage device, such as a RAM (Random Access Memory), a hard disk drive or the like. The storage medium 1005 may be a RAM, a storage device such as a hard disk drive or the like, a ROM (Read Only Memory), or a portable storage medium. The storage device 1003 may operate as the storage medium 1005. The processor 1000 can read data and a program from the memory 1002 and the storage device 1003, and can write data and a program in the memory 1002 and the storage device 1003. The processor 1000 can communicate with a server (not illustrated) which provides frames for the processor 1000, a terminal (not illustrated) to output the final output shape, and the like over the interface 1004. The processor 1000 can access the storage medium 1005. The storage medium 1005 stores a program that causes the computer 1000 operates as the image processing device 100 or the image processing device 100A.

The processor 1000 loads the program, which causes the computer 1000 operates as the image processing device 100 or the image processing device 100A, stored in the storage medium 1005 into the memory 1002. The processor 1000 operates as the image processing device 100 or the image processing device 100A by executing the program loaded in the memory 1002.

The input unit 101, the object tracking unit 102, the feature extraction unit 103, the learning unit 104, the maximum likelihood estimation unit 106, the feature matching unit 107, the estimation unit 108 and the output unit 110 can be realized by a dedicated program that is loaded in the memory 1002 from the storage medium 1005 and can realize each of the above-described units, and the processor 1001 which executes the dedicated program. The model storage unit 105, the template storage unit 109 can be realized by the memory 1002 and/or the storage device such as a hard disk device or the like. A part of or all of the input unit 101, the object tracking unit 102, the feature extraction unit 103, the learning unit 104, the model storage unit 105, the maximum likelihood estimation unit 106, the feature matching unit 107, the estimation unit 108, the template storage unit 109 and the output unit 110 can be realized by a dedicated circuit that realizes the functions of the above-described units.

As a final point, it should be clear that the process, techniques and methodology described and illustrated here are not limited or related to a particular apparatus. It can be implemented using a combination of components. Also various types of general purpose device may be used in accordance with the instructions herein. The present invention has also been described using a particular set of examples. However, these are merely illustrative and not restrictive. For example the described software may be implemented in a wide variety of languages such as C++, Java, Python and Perl etc. Moreover other implementations of the inventive technology will be apparent to those skilled in the art.

While the present invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST 100 image processing device
100A image processing device
101 input unit
102 object tracking unit
103 feature extraction unit
104 learning unit
105 model storage unit
106 maximum likelihood estimation unit
107 feature matching unit
108 estimation unit
109 template storage unit
110 output unit
1000 computer
1001 processor
1002 memory
1003 storage device
1004 interface
1005 storage medium
1006 bus

The invention claimed is:

1. An image processing device comprising:
a feature extraction unit that extracts features from scaled samples generated from given region of interest, after normalizing the samples;
a maximum likelihood estimation unit that derives an estimated probability score of the scaled samples by maximizing the likelihood of a given scaled sample and a parameter of the probability distribution model;
an estimation unit that combines the previous estimates of the object and its features into a single template which represents the object appearance, and that removes samples which have a probability score below the threshold;
a feature matching unit that obtains a similarity between a given template and a scaled sample and selecting the sample with the maximum similarity as the final output.

2. The image processing device according to claim 1, further comprising
   a learning unit that updates the probability distribution model parameters given the distribution of the scaled samples and the template derived from the previous frames.

3. The image processing device according to claim 1,
   Wherein the maximum likelihood estimation unit obtains the probability that a sample is generated by distribution which is given by the model of the distribution of the features, the model is applied to the newly generated scale samples and a score is calculated based on the distance of the samples.

4. The image processing device according to claim 2,
   Wherein the learning unit that learns the probability distribution models parameters by one or more series of training samples and template which are given as true samples and generated from the previous frames.

5. The image processing device according to claim 1,
   Wherein estimation unit that combines the previous estimates of the object and its features into a single template which represents the object appearance.

6. An image processing method comprising:
   a step (a) of extracting features from scaled samples generated from given region of interest, after normalizing the samples;
   a step (b) of deriving an estimated probability distribution score of the scaled samples by maximizing the likelihood of a given scaled sample and a parameters of the probability distribution model;
   a step (c) of combining the previous estimates of the object and its features into a single template which represents the object appearance;
   a step (d) of removing samples which have a probability score below the threshold;
   a step (e) of obtaining a similarity between a given template and a scaled sample and selecting the sample with the maximum similarity as the final output.

7. The image processing method according to claim 6, further comprising
   a step (f) of updating the probability distribution model parameters given the distribution of the scaled samples and the template derived from the previous frames.

8. The image processing method according to claim 6,
   Wherein in the step (b), obtaining the probability that a sample is generated by distribution which is given by the model of the distribution of the features, the model is applied to the newly generated scale samples and a score is calculated based on the distance of the samples.

9. The image processing method according to claim 7,
   Wherein in the step (f) learning the probability distribution models parameters by one or more series of training samples and template which are given as true samples and generated from the previous frames.

10. The image processing method according to claim 6,
    Wherein in the step (c) combining the previous estimates of the object and its features into a single template which represents the object appearance.

11. A non-transitory computer-readable recording medium storing a program that causes a computer to operate as:
    a feature extraction unit that extracts features from scaled samples generated from given region of interest, after normalizing the samples;
    a maximum likelihood estimation unit that derives an estimated probability score of the scaled samples by maximizing the likelihood of a given scaled sample and a parameters of the probability distribution model;
    an estimation unit that combines the previous estimates of the object and its features into a single template which represents the object appearance, and that removes samples which have a probability score below the threshold;
    a feature matching unit that obtains a similarity between a given template and a scaled sample and selecting the sample with the maximum similarity as the final output.

12. The non-transitory computer-readable recording medium according to claim 11, further the program causes the computer to operate as:
    a learning unit that updates the probability distribution model parameters given the distribution of the scaled samples and the template derived from the previous frames.

13. The non-transitory computer-readable recording medium according to claim 11,
    Wherein the maximum likelihood estimation unit obtains the probability that a sample is generated by distribution which is given by the model of the distribution of the features, the model is applied to the newly generated scale samples and a score is calculated based on the distance of the samples.

14. The non-transitory computer-readable recording medium according to claim 12,
    Wherein the learning unit that learns the probability distribution models parameters by one or more series of training samples and template which are given as true samples and generated from the previous frames.

15. The non-transitory computer-readable recording medium according to claim 11,
    Wherein estimation unit that combines the previous estimates of the object and its features into a single template which represents the object appearance.

* * * * *

UNITED STATES PATENT AND TRADEMARK OFFICE
CERTIFICATE OF CORRECTION

PATENT NO. : 10,657,625 B2
APPLICATION NO. : 16/074484
DATED : May 19, 2020
INVENTOR(S) : Karan Rampal Page 1 of 1

It is certified that error appears in the above-identified patent and that said Letters Patent is hereby corrected as shown below:

In the Specification

Column 2, Line 24; Delete "I" and insert --'L'-- therefor

Column 8, Line 44; Delete "T" and insert --'j'-- therefor

Signed and Sealed this
Seventeenth Day of November, 2020

Andrei Iancu
*Director of the United States Patent and Trademark Office*